United States Patent [19]

Tjølsen

[11] Patent Number: 6,007,342
[45] Date of Patent: Dec. 28, 1999

[54] PULSE DEVICE FOR CREATING A SIMULATED FEELABLE HEART'S PULSE TO TRAIN FEELING AND RECOGNITION OF PULSE

[75] Inventor: Øyvind Tjølsen, Gausel, Norway

[73] Assignee: Asmund S. Laerdal AS, Stavanger, Norway

[21] Appl. No.: 08/981,468

[22] PCT Filed: Jun. 17, 1996

[86] PCT No.: PCT/NO96/00148

§ 371 Date: Dec. 30, 1997

§ 102(e) Date: Dec. 30, 1997

[87] PCT Pub. No.: WO97/02553

PCT Pub. Date: Jan. 23, 1997

[30] Foreign Application Priority Data

Jul. 5, 1995 [NO] Norway .................................. 952654

[51] Int. Cl.[6] ............................................... G09B 23/28
[52] U.S. Cl. ........................ 434/265; 434/266; 446/295
[58] Field of Search ................................ 434/262, 307 R, 434/265, 266, 365; 623/3; 600/16, 28; 446/397, 484, 295, 369; 601/78; 395/500, 500.25

[56] References Cited

U.S. PATENT DOCUMENTS

| | | |
|---|---|---|
| 3,276,147 | 10/1966 | Padellford ................................. 434/265 |
| 3,662,076 | 5/1972 | Gordon et al. ............................ 434/266 |
| 3,736,362 | 5/1973 | Laerdal . | 
| 3,947,974 | 4/1976 | Gordon et al. . |
| 3,994,282 | 11/1976 | Moulet ................................. 434/266 X |
| 4,166,337 | 9/1979 | Kosicki et al. ...................... 434/266 X |
| 4,601,665 | 7/1986 | Messmore . |
| 4,718,876 | 1/1988 | Lee ........................................... 446/295 |
| 4,850,876 | 7/1989 | Lutaenko et al. ........................ 434/265 |
| 4,915,635 | 4/1990 | Ingenito et al. ..................... 434/365 X |
| 5,509,810 | 4/1996 | Schertz et al. ............................ 434/262 |

FOREIGN PATENT DOCUMENTS 166824  5/1991  Norway .

*Primary Examiner*—Joe H. Cheng
*Attorney, Agent, or Firm*—Andrus, Sceales, Starke & Sawall

[57] ABSTRACT

A device for simulated heart's pulse in manikins and apparatus used in connection with training how to feel and recognize pulse, comprising an electric linear motor (1), the armature (2) thereof being put into pulsating movements which can be felt upon a touch, an armature coil (3) being supplied with an electric signal from a pulse generator adapted to be started and stopped by means of a signal from a detector coil (5), the inductance of the detector coil (5) being changed when the detector coil (5) is passed in over a ferrite core (6). The armature (2) is assigned a spring, the force thereof being sufficient to bring the armature (2) to the starting position when the external force from the touch ceases.

6 Claims, 4 Drawing Sheets

6,007,342

PULSE DEVICE FOR CREATING A SIMULATED FEELABLE HEART'S PULSE TO TRAIN FEELING AND RECOGNITION OF PULSE

BACKGROUND OF THE INVENTION

The invention relates to a pulse device for creating a simulated feelable heart's pulse to train feeling and recognition of pulse.

The training of feeling and recognition of pulse takes partly place by means of manikins containing technical equipment for simulating body functions and for recording if the student carries out actions concerning diagnosis and treatment in a correct manner.

Sensing the heart's pulse is a central point in many diagnoses. In connection with training, it is important to record if the student really is searching for the heart's pulse, and what kind of measures the student is putting into effect, depending on whether the heart's pulse is present or not.

It is known to provide training manikins with pulse devices at places where the student shall feel with the fingers for heart's pulse. Such pulse devices simulating the pulsation of an artery, are placed such that a pulse can be felt as natural as possible on the outside of the manikin's skin-like surface.

Known pulse devices comprise a hollow elastic pillow or bead which is supplied with an alternating gas or liquid pressure from a pump. An instructor can start and stop the pump and, thus, put the student to various tests. Behind said pillow or bead, a pressure sensor is placed, transmitting signals when the student touches the pulse point, and the instructor can record that the student is carrying out a correct diagnosis.

In known pulse devices, it is usual to use a hand-operated pump or an electrically driven pump, giving a pulsating pressure within said pillow or bead. Electrically operated pumps are as such advantageous, but known suitable electric pumps consumes relatively large amounts of electrical energy, a clear disadvantage when using battery operation and training in the field. Another disadvantage of such pumps is that they produce a sound which may remind the student of the need for feeling the heart's pulse. Also, it has been found that sound from the pump may appear misleadingly in that the student unconsciously ascertains that the heart's pulse is present, such that the student neglects to feel for the heart's pulse in a correct way. Thus, the training becomes unrealistic. Moreover, the pulsation within the pillow/bead influences the pressure sensor, and it requires an expensive signal filtration in order to achieve a secure and safe indication of whether the student feels the artery or not.

Some medical conditions are characterized by the course of pulse. In order to provide a natural pulse for training various medical conditions, it is necessary to be in a position to vary frequency, amplitude and strength. By means of known pulse devices, this is not possible.

SUMMARY OF THE INVENTION

The main object of the invention is to provide an improved device to make feelable simulated heart's pulse in training manikins and other training apparatus. Further, it is an object that pulsation shall stop when the student does not feel for heart's pulse on the pulse point, in order to avoid that sound from the pulse transmitter influences the student.

Also, it is an object that the device shall consume little energy and, thus, be suitable for battery operation. Additionally, it is an object that the feelable pulse shall disappear if the student makes typical errors such as clamping too hard or clamping at both sides of the neck simultaneously.

The objects are obtained by means of features as defined in the following claims.

BRIEF DESCRIPTION OF THE SEVERAL VIEWS OF THE DRAWING

In the following, the invention is described, first generally and, thereafter, by means of an examplary embodiment. Reference is made to the attached drawings, where.

DETAILED DESCRIPTION OF THE INVENTION

Figure 1:
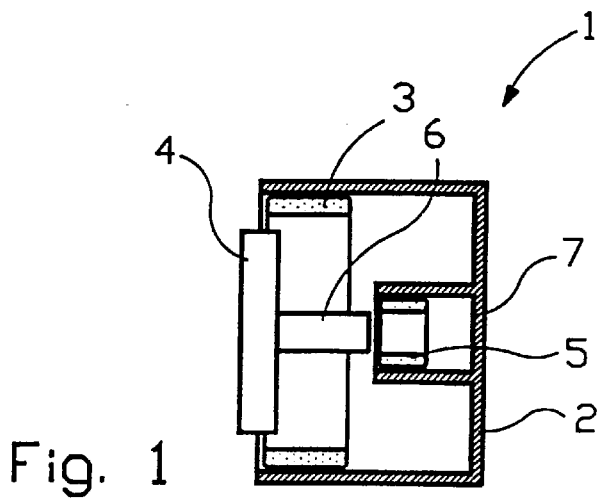
FIG. 1 shows diagrammatically and in section, a mechanical part of a pulse device in the starting position thereof.

In FIG. 1, reference numeral 1 denotes a linear motor with an armature 2, an armature coil 3 adapted to surround a stator 4 containing a permanent magnet. The armature 2 is resiliently suspended in relation to the stator 4, so that the armature 2 naturally occupies a starting position as shown in FIG. 1. The resilient suspension is not shown in FIG. 1.

Further, the armature 2 is assigned a detector coil 5 adapted to surround a ferrite core 6 assigned to the stator 4 when the armature 2 is being displaced towards the stator 4. In the starting position shown, the coil 3 does not or only in a less degree surround the magnetic field of the stator 4, and the detector coil 5 does surround the ferrite core 6 only to a less degree.

The armature 2 may be assigned a body, not shown, on which the student feels, or the armature 2 may itself be formed such that a part of the surface 7 thereof can give a convincing representation of an artery in a pulse feel point on a training manikin.

Figure 2:
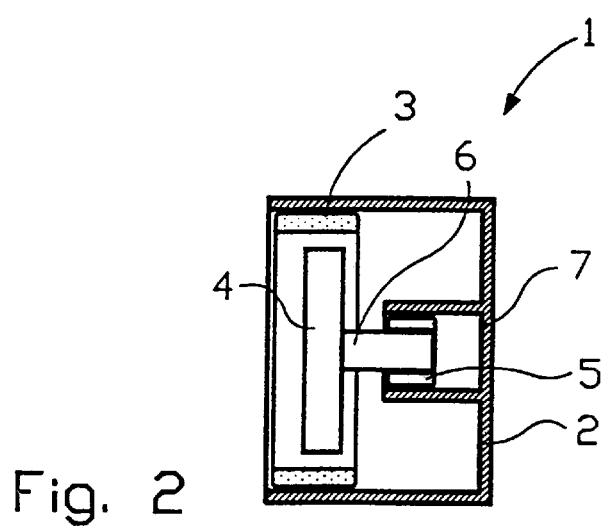
FIG. 2 shows the same part of the pulse device as in FIG. 1, shown in the working position.

In FIG. 2, the armature 2 is displaced in that a student is feeling for the pulse. Here, the armature coil 3 surrounds the magnet field of the stator 4, and the detector coil 5 surrounds the ferrite core 6.

Figure 3:
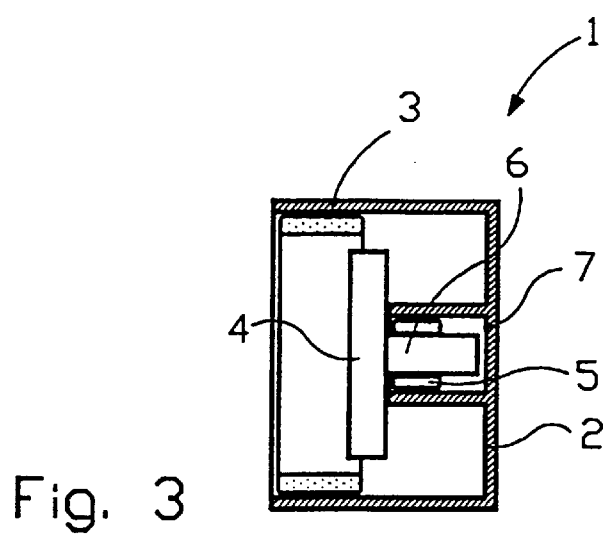
FIG. 3 shows the same part of the pulse device as in FIG. 1 shown in an inoperative end position.

In FIG. 3, the armature 2 is shown further displaced in that the student uses too large a force when feeling for pulse, and the armature coil 3 is pushed out of the magnetic field of the stator 4.

Figure 4:
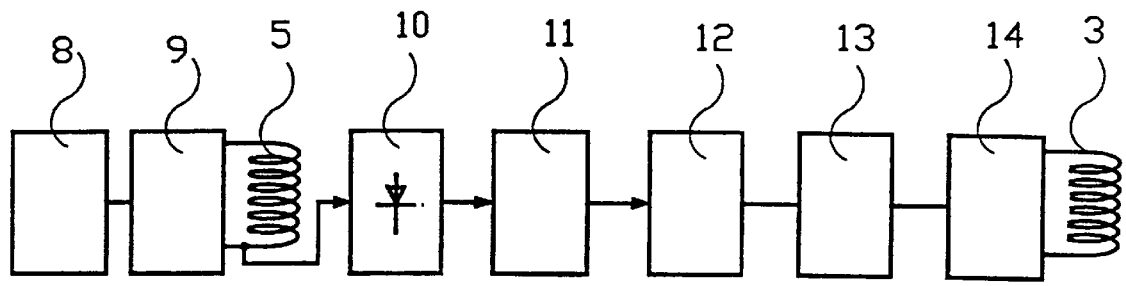
FIG. 4 shows a simplified electrical block diagram for the pulse device.

The detector coil 5 is continuously exited by an oscillator 8 through a driver 9. The detector coil 5 is coupled through a rectifier 10 to a level detector 11 adapted to transmit activation signals to an electrical pulse generator 12 when the signal level exceeds a predetermined value as a result of the inductance of the detector coil 5 being changed. The outlet of the pulse generator 12 is coupled to the armature coil 3 through a filter 13 and a driver 14. See FIG. 4.

In order to achieve a training as realistic as possible, it is important that the feelable pulse is natural. Therefore, the pulse generator 12 is adapted to transmit pulses having a selectable course of time, thus transmitting pulses occuring with various medical conditions, the signal from the pulse generator 12 creating a feelable movement in the armature 2. Also, it is important that the pulse device react as natural as possible when the student feels for pulse. With the invention, this is partly attended to in that the armature coil 3 is displaced past and out of the magnetic field of the stator 4 if the student erroneously squeezes too hard. Thus, the linear motor 1 becomes powerless, and it does not give a feelable pulse even if the pulse generator 12 is active.

Figure 5:
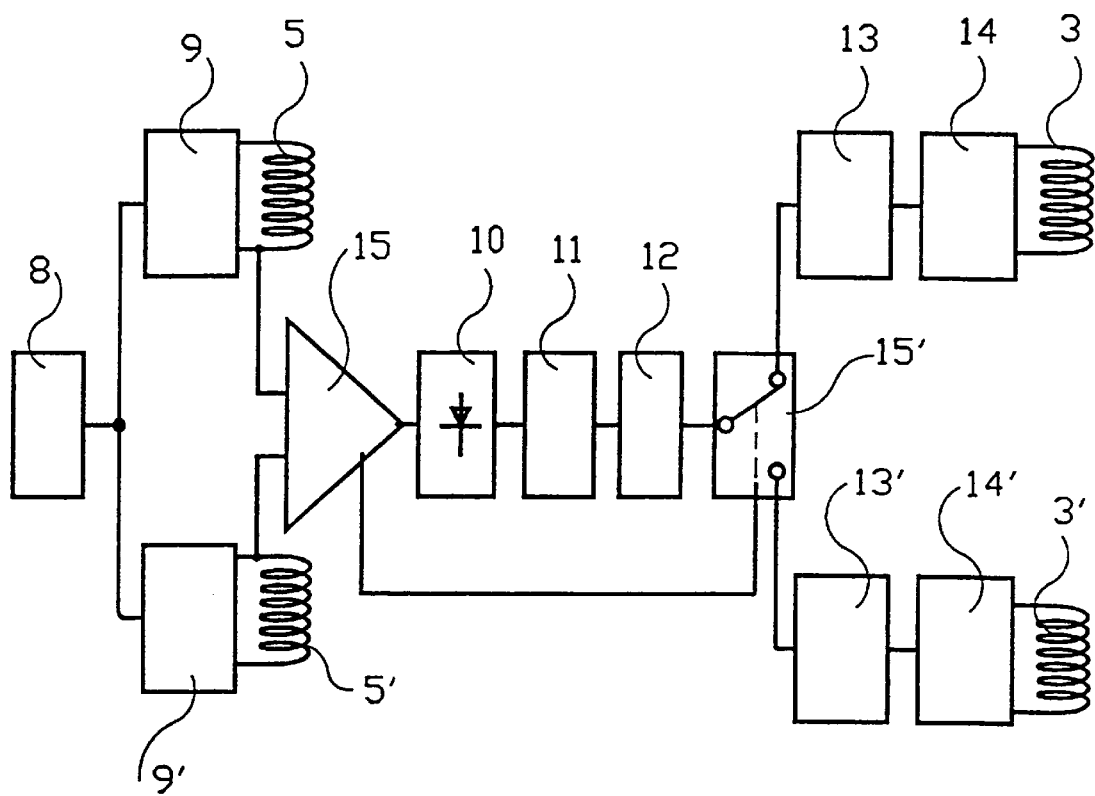
FIG. 5 shows a simplified block diagram for two cooperating pulse devices.

Another usual student's error is to squeeze on the arteries at both sides of the neck simultaneously and, thus, prevent through-flow of blood in the head. In such cases, it is desirable that the simulated pulse ceases. FIG. 5 shows a block diagram for two cooperating pulse devices such coupled that the simulated pulse ceases if the student squeezes on both of them simultaneously. A common oscillator 8 exites two detector coils 5, 5' through drivers 9, 9'. The signal from the detector coils 5, 5' is compared in a comparator 15 which transmits signals if the signal level is different in the two detector coils 5, 5'. The output signal from the comparator 15 passes through the rectifier 10 to the level detector 11, transmitting activation signals to the pulse generator 12 at a predetermined signal level. The pulse generator's 12 output signal is coupled to two armature coils 3, 3' through a controlled selector 15'. Between the selector 15' and the armature coils 3, 3', filter and driver are disposed, 13, 14 and 13', 14', respectively, such as already described. The comparator 15 is adapted to transmit signals to the selector 15', thus controlling the pulse generator's 12 output signal to the armature coil 3, 3' corresponding to the detector coil 5, 5' activated.

In order to secure that the linear motor 1 functions in accordance with its purpose, even if the armature 2 is oblique loaded while a student is feeling for a pulse, it is important to secure that the armature 2 does not get stuck in an oblique position. This necessitates some form of guidance for the armature 2. On the other hand, it is important that the linear motor 1 can be activated without having to squeeze unnaturally hard, and that the pulse point itself is felt as being loose and natural. These partially contradictory considerations are attended to by means of a preferred embodiment of the linear motor 1.

Figure 6:
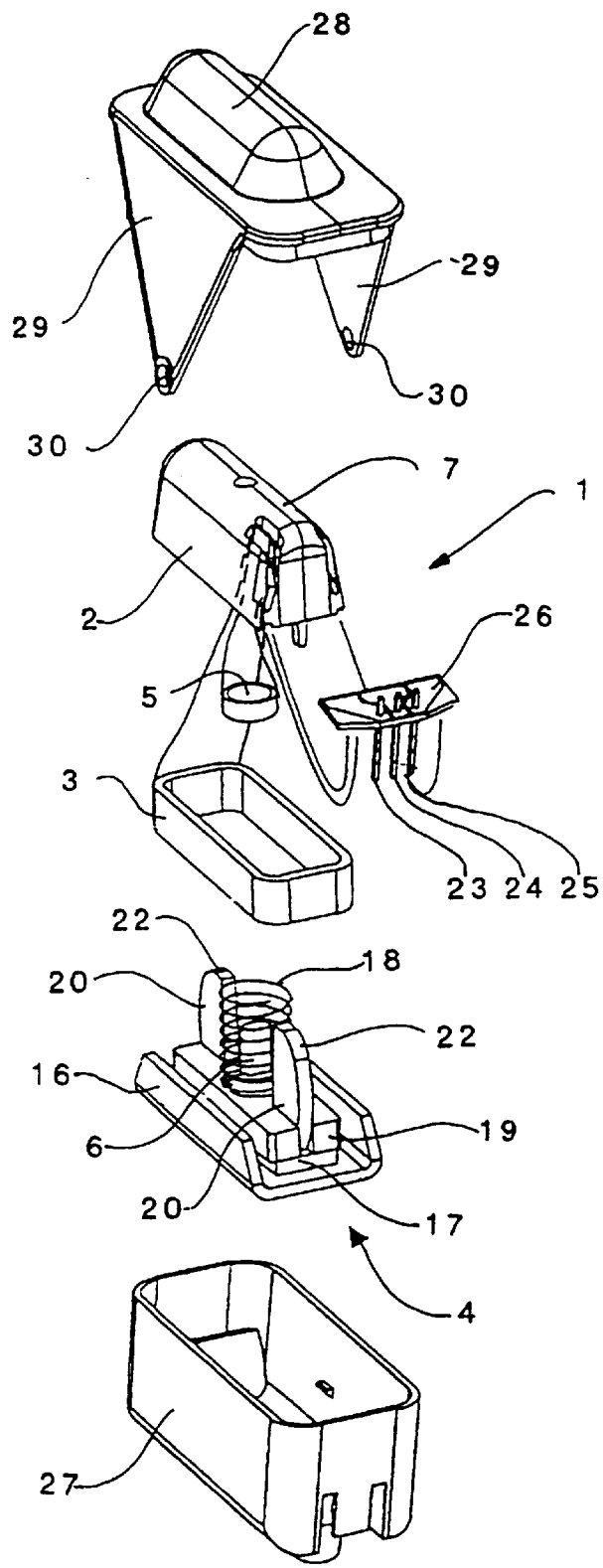
FIG. 6 shows a perspective split view of the mechanical part of a pulse device.

FIG. 6 shows an exploded view of a preferred embodiment of the linear motor 1, where the armature 2 is shaped as an inverted trough, such that the shape of the surface 7 for the student resembles the surface of an artery. The armature coil 3 is mounted in the lower portion of the armature 2, while the detector coil 5 is mounted in the upper portion of the armature 2. The stator 4 comprises a yoke 16 which is assigned a permanent magnet 17 and a ferrite core 6 having a surrounding spring 18 adapted to push the armature 2 towards the starting position. A pole shoe 19 concentrates the magnetic field of the stator 4. The spring 18 secures that the armature 2 always occupies the starting position when the student does not touch the pulse feel point.

Further, the yoke 16 is assigned two baffles 20 adapted to slide between rails 21 disposed within the armature 2, see FIG. 6. Further, the baffles 20 are adapted to rest internally against the end walls of the armature 2 at one edge 22 of said baffles 20. The edge 22 is rounded in order to allow a certain oblique positioning of the armature 2 in relation to the yoke 16, especially when the armature 2 is situated close to the starting position.

Figure 7:
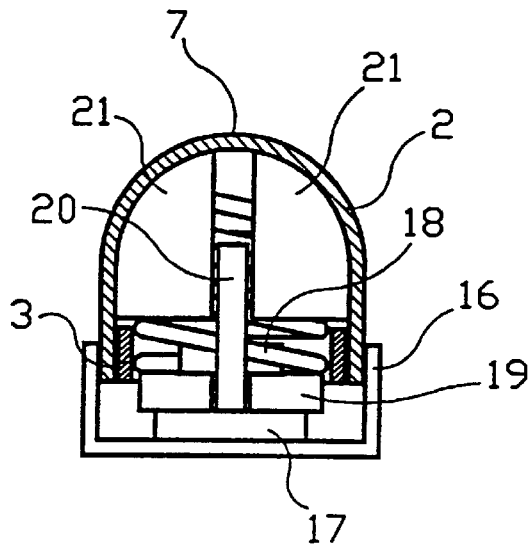
FIG. 7 shows partly in section, as viewed from the end, the mechanical part of the pulse device.
Figure 8:
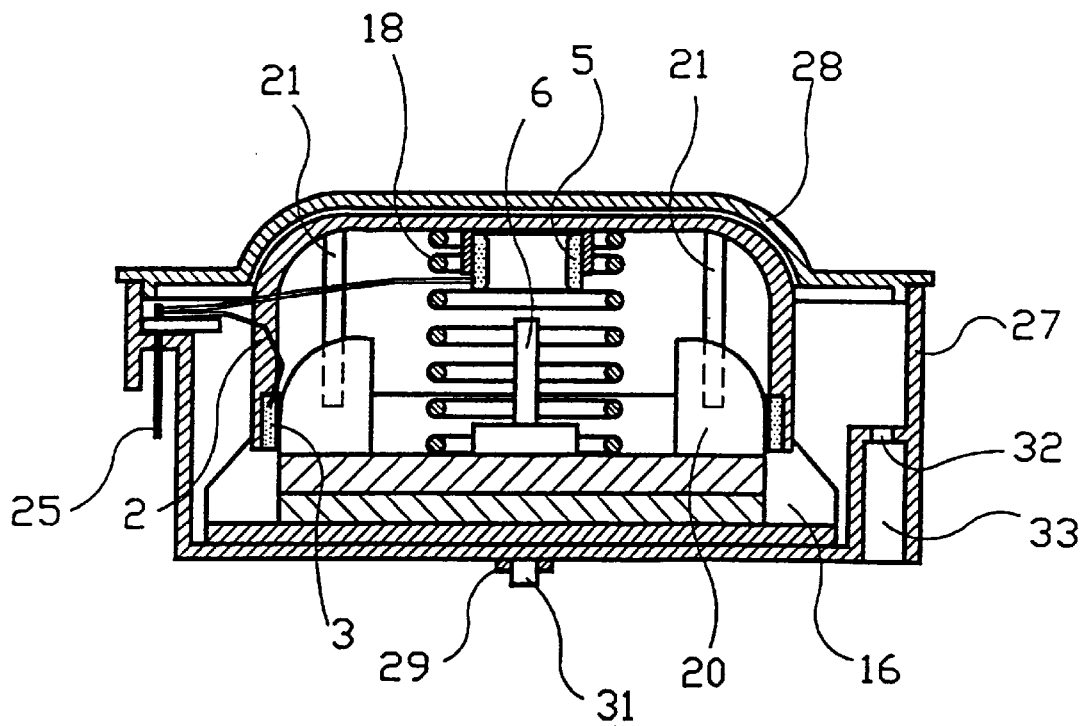
FIG. 8 shows partly in section, as viewed from the side, the mechanical part of the pulse device.

Contact pins 23, 24, 25 electrically connected to the armature coil 3 and the detector coil 5 through the wall of the armature 2 are mounted in a contact plate 26. The yoke 16, the armature 2 and the contact plate 26 are mounted within a box-shaped housing 27 such as shown in FIGS. 7 and 8. An elastic hood 28, preferably of soft silicone rubber, is adapted to cover the armature 2 and seal against the housing 27. The hood 28 is provided with elastic attaching ears 29 with attaching holes 30, and the hood is fastened to the housing 27 in that the attaching ears 29 are tensioned down along the sides of the housing 27 and fixed to a tenon 31 at the bottom side of the housing 27, see FIGS. 7 and 8.

The housing 27 has to be vented in order to be able of moving the hood 28 and the armature 2 freely. With relatively small clearances between the baffles 20 and the armature 2, respectively the armature coil 3 and the pole shoe 19, it is important to avoid foreign matter. Especially the magnet 17 could attract foreign matter through a ventilation aperture in the housing 27. Therefore, the housing 27 is provided with a ventilation aperture 32 at the end of a channel 33 passing past one end of the magnet 17, see FIG. 8. Foreign matter attracted by the magnet 17 will, therefore, not reach the ventilation aperture 32, but will be suspended within the channel 33 where the magnetic field is strongest.

I claim:

1. A device for simulated heart's pulse in manikins and apparatus used in connection with training how to feel and recognize heart's pulse, where an electric linear motor (1) comprising a stator (4) and an armature (2) gives a pulse body feelable movements in that a pulse generator (12) gives pulsating electric signals to the linear motor (1), characterized in that the armature (2) is assigned a positional sensor adapted to react on the armature's (2) position and activate the pulse generator (12) when the linear motor's (1) armature (2) is displaced from an end position, the starting position.

2. A device as set forth in claim 1, characterized in that the armature (2) of the linear motor (1) is assigned a biased spring (18) adapted to maintain the armature (2) in the starting position, and where the force from the spring (18) is larger than the oppositely directed force which can be offered by the linear motor (1) when the armature (2) takes the starting position.

3. A device as set forth in claim 2, characterized in that the armature (2) when occupying the starting position, is substantially out of the magnetic field of the stator (4).

4. A device as set forth in claim 1, characterized in that the armature (2) when occupying the starting position, is substantially out of the magnetic field of the stator (4).

5. A device as set forth in claim 1, characterized in that the armature (2) is assigned a detector coil (5) adapted to be moved in over and surround a ferrite core (6) when the armature (2) is displaced from a starting position; and where the detector coil (5) is coupled to a level detector (11) in the controller, and where the level detector (11) is adapted to give activation signal to the pulse generator (12) of the controller when the inductance of the detector coil (5) reaches a predetermined value, the detector coil (5) being continuously exited by an oscillator (8).

6. A device as set forth in claim 1, characterized in that the linear motor (1) is mounted within a housing (27) provided with a ventilation aperture (32) at the end of a channel (33) passing the magnetic field of the stator (4).

* * * * *